July 12, 1927.
I. S. ANDERSON
AERATOR AND COOLER FOR CREAM SEPARATORS
Filed June 1, 1926
1,635,877
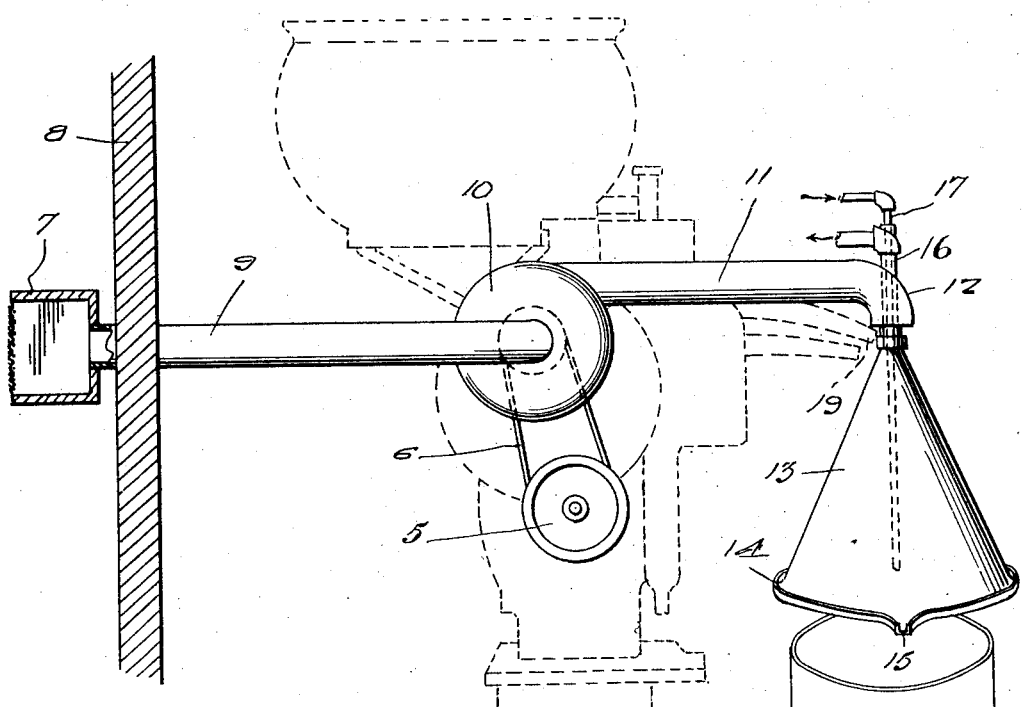
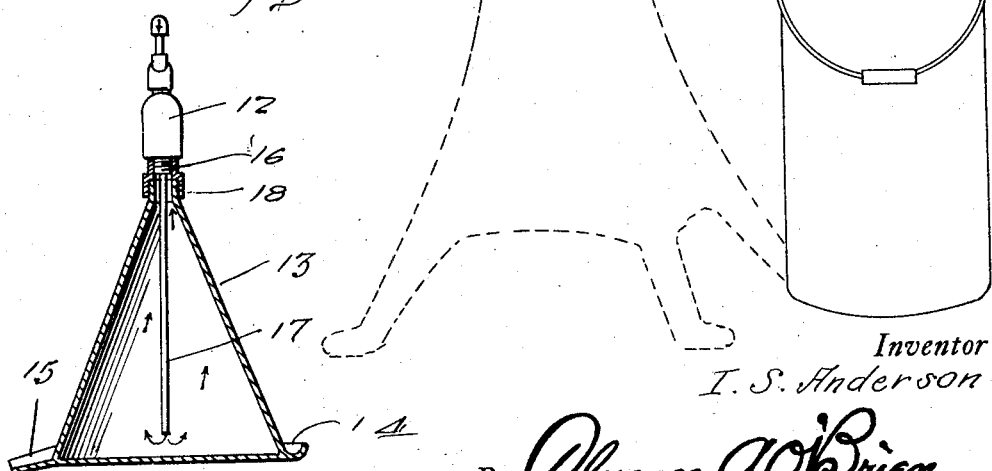
Inventor
I. S. Anderson
By Clarence A. O'Brien
Attorney Patented July 12, 1927.

1,635,877

UNITED STATES PATENT OFFICE.

IRVING S. ANDERSON, OF FRANKLIN, MINNESOTA.

AERATOR AND COOLER FOR CREAM SEPARATORS.

Application filed June 1, 1926. Serial No. 112,962.

The present invention relates to a cream aerator and cooler designed particularly for use upon the standard cream separators now in common use, being of such a construction that it may be easily and quickly associated with the separator.

An important object of the invention is to provide a device of this nature which is thoroughly sanitary because of the washability thereof.

Another important object of the invention resides in the provision of a device of this nature which will simultaneously cool the cream and aerate the same.

A still further important object of the invention is to provide a contrivance of this nature which is exceedingly simple in its construction, efficient and reliable in use, inexpensive to manufacture, strong, durable, compact, convenient, and otherwise well adapted to the purpose for which it is designed.

A further object of the invention lies in the provision of a cone-shaped member having an inlet and outlet at its top so that water may be fed interiorly thereof for cooling the walls over which cream is adapted to be poured and the provision of a trough at the bottom for catching said cream and pouring it into a suitable receptacle.

With the above and numerous other objects in view as will appear as the description proceeds, the invention resides in certain novel features of construction, and in the combination and arrangement of parts as will be hereinafter more fully described and claimed.

In the drawing:—

Figure 1 is an elevation of the contrivance embodying the features of this invention, and Fig. 2 is a sectional view through the cone-shaped member thereof.

Referring to the drawing in detail, it will be seen that I have illustrated in dotted lines, one of the numerous standard cream separators, which is provided with a pulley wheel indicated at 5 having, in the present instance, a belt 6 trained thereover. The aerating is accomplished by a draft of air drawn in through a screen box 7 outside of a building 8, within which the cream separator is disposed. This air passes through pipe 9.

A blower 10 is in communication with the inner end of the pipe 9 and blows the air through a conductor pipe 11 which has its extremity curved downwardly as is indicated at 12. A cone-shaped container 13 is constructed with a trough 14 exteriorly thereof and at the base thereof, and merging at a portion into an outlet spout 15. An outlet pipe 16 has a coupling engaged with the apex of the cone-shaped container 13, and extends co-axially through the downwardly bent portion 12 of the conductor pipe 11.

An inlet pipe 17 extends through the outlet pipe 16 and terminates adjacent the base of the cone container 13. This pipe 17 is connected to any suitable source of water supply so that the running water will run therethrough into the container 13 and exhaust out through the pipe 16.

The outlet spout 19 of the cream separator terminates adjacent the apex of the cone-shaped container and allows the cream to flow on the exterior surface thereof, and it will thus be seen that the cone shaped wall of this container is cooled by the water circulating therethrough so that the cream is cooled as it flows down the walls into the trough 14 and simultaneously the cream is thoroughly aerated by the blast of air from the conductor pipe 11. The cooling container 13 is very easily detached for washing, because of its threaded engagement with the pipe 16 as is shown at 18. Thus the cone may be taken away and the exterior surface thoroughly washed.

It is just the outer surface of the cooling container that comes in contact with the cream, therefore, washability is one of the great advantages of this cooler. No cooler can be used that cannot be thoroughly and easily washed. It is practical, can be attached to any standard separator, requires very little extra power to run the blower fan, and easy hose connections may be made for cooling.

The device is efficient, it will lower the temperature of cream forty degrees. This is very necessary in the manufacture of sweet cream butter. The airing of the cream carries foul odors and flavors away. The airing of cream is the only way to remove undesirable foreign flavors from cream. The next great advantage is time saving. When the separating is done, the aerating and cooling is done almost simultaneously therewith.

It is thought that the construction, operation, and advantages of this invention will now be clearly understood by those skilled in this art without a more detailed description thereof. The present embodiment of the invention has been disclosed in detail merely by way of example, since in actual practice it attains the features of advantage enumerated as desirable in the statement of the invention and the above description. It is apparent that numerous changes in the details of construction, and in the combination and arrangement of parts may be resorted to without departing from the spirit or scope of the invention as hereinafter claimed or sacrificing any of its advantages.

Having thus described my invention, what I claim as new is:—

1. In combination, a conductor pipe, a blower associated with said conductor pipe, one terminal of the conductor pipe being directed downwardly, a water outlet pipe extending through the downwardly directed portion of the conductor pipe co-axially therewith, a cone-shaped container into which the lower end of the water exhaust pipe is threaded, and a water intake pipe extending through the water outlet pipe into the container terminating adjacent the bottom end thereof.

2. In combination, a conductor pipe, a blower associated with said conductor pipe, one terminal of the conductor pipe being directed downwardly, a water outlet pipe extending through the downwardly directed portion of the conductor pipe co-axially therewith, a cone-shaped container into which the lower end of the water exhaust pipe is threaded, a water intake pipe extending through the water outlet pipe into the container terminating adjacent the bottom end thereof, and an annular trough formed on the base of the container exteriorly thereof and merging at a portion into a spout.

3. In combination, a conductor pipe, a blower associated with said conductor pipe, one terminal of the conductor pipe being directed downwardly, a water outlet pipe extending through the downwardly directed portion of the conductor pipe co-axially therewith, a cone-shaped container into which the lower end of the water exhaust pipe is threaded, a water intake pipe extending through the water outlet pipe into the container terminating adjacent the bottom end thereof, a pipe leading into the blower and having a feed box at its intake terminal.

4. In combination, a cone-shaped container, the apex of the container being open and internally threaded, a flange formed exteriorly about the base of the container and merging at a portion into a spout, a water outlet pipe threaded into the apex opening, and a water intake pipe extending through the outlet pipe into the container and terminating a distance from the bottom thereof.

5. In combination, a cone-shaped container, the apex of the container being open and internally threaded, a flange formed exteriorly about the base of the container and merging at a portion into a spout, a water outlet pipe threaded into the apex opening, a water intake pipe extending through the outlet pipe into the container and terminating a distance from the bottom thereof, and an aerating pipe having a portion thereof surrounding the water outlet pipe and terminating above the apex of the container.

In testimony whereof I affix my signature.

IRVING S. ANDERSON.